(12) United States Patent
Spruck et al.

(10) Patent No.: US 8,692,981 B2
(45) Date of Patent: Apr. 8, 2014

(54) EVALUATION DEVICE, MEASURING ARRANGEMENT AND METHOD FOR PATH LENGTH MEASUREMENT

(75) Inventors: Bernd Spruck, Moegglingen (DE); Frank Hoeller, Aalen (DE); Cristina Alvarez Diez, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 262 days.

(21) Appl. No.: 13/377,410

(22) PCT Filed: Jun. 10, 2010

(86) PCT No.: PCT/EP2010/058139
§ 371 (c)(1),
(2), (4) Date: Dec. 9, 2011

(87) PCT Pub. No.: WO2010/142758
PCT Pub. Date: Dec. 16, 2010

(65) Prior Publication Data
US 2012/0092644 A1    Apr. 19, 2012

(30) Foreign Application Priority Data
Jun. 10, 2009  (DE) .......................... 10 2009 024 460

(51) Int. Cl.
*G01C 3/08*  (2006.01)
(52) U.S. Cl.
USPC .......... 356/5.01; 356/3.01; 356/4.01; 356/5.1
(58) Field of Classification Search
CPC ....................................................... G01C 3/08
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 4,537,502 A * | 8/1985 | Miller et al. | ................. 356/5.11 |
| 4,818,100 A | 4/1989 | Breen | |
| 6,100,540 A | 8/2000 | Ducharme | |

FOREIGN PATENT DOCUMENTS

| | | |
|---|---|---|
| CH | 685516 A5 | 7/1995 |
| CN | 1167250 | 12/1997 |
| DE | 1031005 | 5/1958 |
| DE | 102008045386 | 3/2010 |
| DE | 102008045387 | 3/2010 |

OTHER PUBLICATIONS

Kaoru Minoshimia and Hirokazu Matsumoto, High-Accuracy Measurement of 240-m Distance in an Optical Tunnel by Use of a Compact Femtosecond Laser, Allied Optics, Oct. 20 2000.

(Continued)

*Primary Examiner* — Luke Ratcliffe
(74) *Attorney, Agent, or Firm* — Sand & Sebolt

(57) ABSTRACT

An evaluation device, measuring arrangement and method for path length measurement. The evaluation device for path length measurement is configured to evaluate a measured signal which represents an intensity of a sequence of pulses of electromagnetic radiation as a function of time. The sequence of pulses has a repetition rate. The evaluation device is configured to determine a phase difference between a component of the measured signal, the component oscillating with a frequency, and a reference signal which oscillates with the frequency. For this purpose, the evaluation device generates, for example by frequency mixing, a first signal and a second signal which have another phase difference, such that the first signal and the second signal each oscillates with another frequency which is different from said frequency, and that the other phase difference has a predetermined relation to the phase difference.

20 Claims, 6 Drawing Sheets

(56) References Cited

OTHER PUBLICATIONS

Enrico Mohns and Martin Kahmann, Heterodyne Measurement System (HMS) for Determining Phase Angles, IEEE Transactions on Instrumentation and Measurement, Apr. 2007.

S. Stein, D. Glaze, J. Levine, J. Gray, D. Hilliard, D. Howe, and L.A. Erb, Automated High-Accuracy Phase Measurement System, IEEE Transactions on Instrumentation and Measurement, Mar. 1983.
8508A Vector Voltmeter Operating and Service Manual, Manual Part No. 08508-90000, revised May 1, 1998, date of publication unknown/author unknown, printed Nov. 14, 2013.

* cited by examiner

EVALUATION DEVICE, MEASURING ARRANGEMENT AND METHOD FOR PATH LENGTH MEASUREMENT

CROSS-REFERENCE TO RELATED APPLICATIONS

This application is a National Phase Entry of PCT/EP2010/058139 having an International Filing Date of Jun. 10, 2010, which PCT application claims priority from German Patent Application No. DE 10 2009 024 460.3 filed Jun. 10, 2009.

The present invention relates to an evaluation device, a measuring arrangement and a method for path length measurement. The present invention relates in particular to an evaluation device, a measuring arrangement and a method for path length measurement using optical measuring techniques.

The measurement of distances has a variety of application areas, for example in the control or in the feedback control of various machines and apparatuses in industry, medicine, and entertainment industry. Measuring distances of an object relative to plural reference positions, or of plural points of an object relative to a reference position, allows the position of an object to be determined in a two- or three-dimensional space, which has wide applicability in production technology or quality control, for example.

Distances may be determined by measuring a path length covered by electromagnetic radiation, such as light. For this purpose, the electromagnetic radiation travels once or plural times through the path between a reference position and the object, so that the distance is derivable from the path length covered by the radiation.

It is a technical challenge to implement devices and methods in which distances or object positions are determined with a precision in the range of a few micrometers or a few tens of micrometers, in spaces having a length of a few meters. This applies in particular if positions are to be determined at a high measurement rate and with a short signal processing time, to allow a position to be determined in close to real time.

Laser path length measuring devices allow a distance of an object to be determined. In K. Minoshima and H. Matsumoto, "High-accuracy measurement of 240-m distance in an optical tunnel by use of a compact femtosecond laser", Applied Optics, Vol. 39, No. 30, pp. 5512-5517 (2000), a distance measurement using frequency combs is described. In this measurement technique, the phase angle of a signal component of the intensity of the laser beam frequency comb is evaluated to determine a path length covered by the laser beam, after it has covered a path between light source, object and detector. For this purpose, the signal component is selected such that it oscillates with a frequency which corresponds to a typically large multiple of the repetition rate of the laser beam. Accordingly, the evaluation electronics must meet high demands, as it must be capable of processing, in particular mixing, signals having frequencies which typically lie in the range of several 10 GHz. The photodetectors which are used must comply with similarly high demands, as they must be capable of capturing variations in the received intensity at frequencies in the rage of several 10 GHz.

The invention has the object to provide an improved evaluation device, an improved measuring arrangement and an improved method for path length measurement. In particular, the invention has the object to provide an evaluation device, a measuring arrangement and a method which allows a position to be determined rapidly with a good spatial resolution.

According to the invention, this object is attained by an evaluation device, a measuring arrangement and a method according to the independent claims. The dependent claims define advantageous or preferred embodiments.

According to an aspect, an evaluation device for path length measurement is provided. The evaluation device is configured for use for a path length measurement in which a sequence of pulses of electromagnetic radiation, in particular a sequence of light pulses, covers a path length to be measured, with the sequence of pulses having a repetition rate. The evaluation device is configured to evaluate a measured signal which represents an intensity of the sequence of pulses as a function of time, after the sequence of pulses has covered the path length to be measured. The evaluation device is configured to determine a phase difference between a component of the measured signal, the component oscillating with a frequency, and a reference signal which oscillates with the frequency, with the frequency corresponding to the repetition rate or a multiple of the repetition rate. The evaluation device is configured to generate, in order to determine the phase difference, a first signal and a second signal which have another phase difference, such that the first signal and the second signal each oscillates with another frequency which is different from said frequency, and that the other phase difference has a predetermined relation to the phase difference.

A spectral component of the measured signal, i.e. of the captured light intensity as function of time, is herein referred to as a component of the measured signal which oscillates with a frequency. For example, the component which oscillates with the frequency may be the component in a Fourier representation of the measured signal which is associated with the respective frequency. The term "multiple of the repetition rate" refers to an integer multiple of the repetition rate.

The other phase difference may be determined by evaluating the first signal and the second signal which oscillate with the other frequency, because the evaluation device generates the first signal and the second signal such that the other frequency is different from the frequency of the measured signal. This allows the other frequency to be suitably selected in accordance with the respective demands on the measurement accuracy and with phase meters which are available.

The evaluation device may be configured to generate the first signal and the second signal such that the other phase difference is equal to the phase difference between said component of the measured signal and the reference signal. In particular, the term "other phase difference" does not imply that the other phase difference must have a value which is different from the phase difference. If the other phase difference is equal to the phase difference, the phase difference may be determined immediately by determining the other phase difference, with the phase difference providing a measure for the path length covered by the sequence of pulses.

The evaluation device may be configured to generate the first signal and the second signal such that the other frequency, at which the generated first signal and the generated second signal oscillate, is less than said frequency. The evaluation device may, in particular, be configured to generate the first signal and the second signal such that the other frequency, at which the generated first signal and the generated second signal oscillate, is less than the repetition rate. As the frequency of the first and second signals is smaller relative to the frequency of said component of the measured signal, the determination of the other phase difference may be made based on signals which oscillate more slowly, for example by measuring a time offset between the first signal and the second signal.

The evaluation device may be configured to generate the first signal by down-converting said component of the measured signal. The evaluation device may also be configured to generate the second signal by down-converting the reference signal. A "down-conversion" of a given signal relates, in particular, to a process in which the given signal is subjected to a frequency mixing to generate another signal that oscillates with a smaller frequency. An output signal of the frequency mixing may be subjected to a band pass filtering or a low pass filtering to obtain, from the product of the mixing, the signal which oscillates with the smaller difference frequency. The evaluation device may be configured to mix said component of the measured signal and the reference signal, respectively, with the same third oscillating signal to generate the first signal and the second signal, respectively.

The evaluation device may have a signal processing path for the measured signal and another signal processing path for the reference signal to generate the first signal and the second signal.

The signal processing path for the measured signal may have a mixer to mix said component of the measured signal with a third oscillating signal to generate the first signal. The signal processing path may have a filter to filter an output signal of the mixer. The filter may, in particular, be a band pass filter or a low pass filter. The filter may have a pass band which comprises a frequency that is less than the repetition rate.

The signal processing path may have at least one second mixer to mix an output signal of the mixer with a fourth oscillating signal to generate the first signal. Thereby, the first signal may be generated by down-converting said component of the measured signal in plural stages. For example, a signal in an intermediate frequency range may first be generated, which is then supplied to the at least one second mixer.

The other signal processing path for the reference signal may have another mixer to mix the reference signal with the third oscillating signal to generate the second signal. The other signal processing path may have another filter to filter an output signal of the other mixer.

The other signal processing path may have at least one other second mixer to mix an output signal of the other mixer with the fourth oscillating signal to generate the second signal. Thereby, the second signal may be generated by down-converting the reference signal in plural stages, i.e. via an intermediate frequency range.

The third oscillating signal may have a frequency which is selected such that a quotient of the frequency of the third oscillating signal and the repetition rate is not an integer number. Thereby, the first and second oscillating signal may be generated such that the other frequency may be selected to be less than the repetition rate.

The evaluation device may be configured to generate the third oscillating signal from the reference signal. For this purpose, a frequency divider may be provided which is coupled, at an input side, to the signal processing path or the other signal processing path to generate the third oscillating signal having a frequency which is not a multiple of the repetition rate. The frequency divider may be configured as a digital frequency divider.

The evaluation device may comprise a phase meter device having inputs for the first signal and the second signal to determine the other phase difference. The phase meter device may be configured to measure a time between a zero passage of the first signal and a zero passage of the second signal to determine the other phase difference. For this purpose, a first comparator or limiting amplifier and a second comparator or limiting amplifier may be provided, for example, in order to detect zero passages of the first signal and the second signal, respectively, and a counter may be provided to determine a number of pulses of a clock signal between the detected zero passages of the first and second signal. The other phase difference may be determined from the determined number of clock pulses between the zero passages and the other frequency of the first and second signal. The phase meter device may also comprise a time-to-digital-converter.

According to another aspect, a measuring arrangement for path length measurement is provided. The measuring arrangement comprises a detector which is configured to capture an intensity of a sequence of pulses of electromagnetic radiation, in particular of a sequence of light pulses, as a function of time after the sequence of pulses has covered a path length to be measured, with the sequence of pulses having a repetition rate. The detector is configured to provide a measured signal which represents the captured intensity. The measuring arrangement further comprises an evaluation device coupled to the detector to process the measured signal provided by the detector, wherein the evaluation device is configured as an evaluation device according to an aspect or embodiment of the invention.

The measuring arrangement may comprise a light source for generating the sequence of pulses. The light source may comprise a laser, in particular a short pulse laser. The light source may comprise a frequency comb generator. Frequency combs may have a high frequency and phase stability, and are therefore suitable a light sources for distance measurement.

The reference signal may be provided in various ways in the measuring arrangement. The light source may, for example, be configured to output an output signal which represents an intensity of the sequence of pulses generated by the light source as a function of time, with the evaluation device being coupled to the light source and being configured to generate the reference signal from the output signal of the light source. The measuring arrangement may also comprise another detector which is configured to capture an intensity of the generated sequence of pulses as a function of time at a reference position. The evaluation device may then be coupled to the other detector and may be configured to generate the reference signal from an output signal of the other detector. A beam splitter may be provided which can be arranged in the beam path of the sequence of pulses generated by the light source, to direct a reference beam to the other detector, while a measurement beam travels through the path length to be measured.

According to another aspect, a method for path length measurement is provided. In the method, a measured signal is captured and evaluated which represents an intensity of a sequence of pulses of electromagnetic radiation, in particular of a sequence of light pulses, as a function of time after the sequence of pulses has covered a path length to be measured. The method comprises determining a phase difference between a component of the measured signal, the component oscillating with a frequency, and a reference signal oscillating with said frequency, with the frequency corresponding to the repetition rate or a multiple of the repetition rate. To determine the phase difference, a first signal and a second signal are generated such that the first signal and the second signal each oscillates with another frequency which is different from said frequency, and that the first signal and the second signal have another phase difference which has a predetermined relation to said phase difference.

The other phase difference may be determined by evaluating the first signal and the second signal which oscillate with the other frequency, because the first signal and the second signal are generated such that the other frequency is different from the frequency. The phase difference can be determined from the other phase difference, because the other phase difference has a predetermined relation to the phase difference between said component of the measured signal and the reference signal.

The first signal and the second signal may be generated such that the other phase difference is equal to the phase difference between said component of the measured signal and the reference signal.

The first signal and the second signal may be generated such that the other frequency at which the generated first signal and the generated second signal oscillate, is less than said frequency. In particular, the other frequency may be less than the repetition rate of the sequence of pulses of electromagnetic radiation.

The component of the measured signal may be down-converted to generate the first signal. The component of the measured signal may be down-converted in plural stages. For example, the component of the measured signal may be down-converted to generate a signal in an intermediate frequency range, and the signal in the intermediate frequency range may be down-converted further to generate the first signal.

The reference signal may be down-converted to generate the second signal. The reference signal may be down-converted in plural stages.

Said component of the measured signal and the reference signal may respectively be mixed with a third oscillating signal to generate the first signal and the second signal by down-conversion. A frequency of the third oscillating signal may be selected such that the frequency of the third oscillating signal is not a multiple of the repetition rate.

In particular, the frequency of the third oscillating signal may be selected such that a quotient of the frequency of the third oscillating signal and the repetition rate is not an integer number.

The other phase may be determined by determining a time difference between zero passages of the first signal and of the second signal.

The sequence of pulses of electromagnetic radiation may be generated using a short pulse laser. The short pulse laser may, in particular, be configured as a frequency comb generator.

In the method, the measured signal may be evaluated using the evaluation device according to an aspect or embodiment of the invention. The method may be performed using the measuring arrangement according to an aspect or embodiment.

The evaluation device, the measuring arrangement and the method according to the various aspects and embodiments may be configured to determine a distance of an object from a reference position. For this purpose, an arrangement may be selected in which the sequence of pulses of electromagnetic radiation travels twice through the path between reference position and object. For example, a reflector may be provided on the object to reflect the sequence of pulses of electromagnetic radiation. It is also possible that an arrangement is selected in which the detector is provided on the object or in which the sequence of light pulses is emitted from the object.

The evaluation device, the measuring arrangement and the method according to the various aspects and embodiments may also be used to determine the distances of an object from plural reference positions, or to determine the distances of plural regions of the object which are spaced from each other relative to a reference position. The position and/or orientation of the object in space may be determined from the determined distances, for example using trilateration. The evaluation device, the measuring arrangement and the method according to the various aspects and embodiments may be used for determining a position in the applications described in DE 10 2008 045 387 and DE 10 2008 045 386. The evaluation device, the measuring arrangement and the method according to the various aspects and embodiments may also be used for determining a position of a probe head of a coordinate measuring machine, as described in the German patent application "Auswerteeinrichtung, Messanordnung und Verfahren zur Weglängenmessung sowie Messanordnung und Verfahren für ein Koordinatenmessgerät und Koordinatenmessgerät" (Evaluation device, measuring arrangement and method for path length measurement and measuring system and method for a coordinate measuring device and coordinate measuring device) of the applicant, filed on the same day.

The evaluation devices, measuring arrangements and methods according to various embodiments of the invention may generally be used to measure path lengths, in particular for a path length measurement or a position determination. Measurement applications in industrial installations, such as in automated production or transportation installations, are an exemplary field of application. However, the embodiments of the invention are not limited to these applications.

The invention will be described in more detail hereinafter by means of embodiments with reference to the accompanying drawing.

FIG. 3A exemplarily shows a sequence of light pulses as function of time, and FIG. 3B schematically shows a Fourier spectrum of the sequence of light pulses of FIG. 3A.

Figure 4:
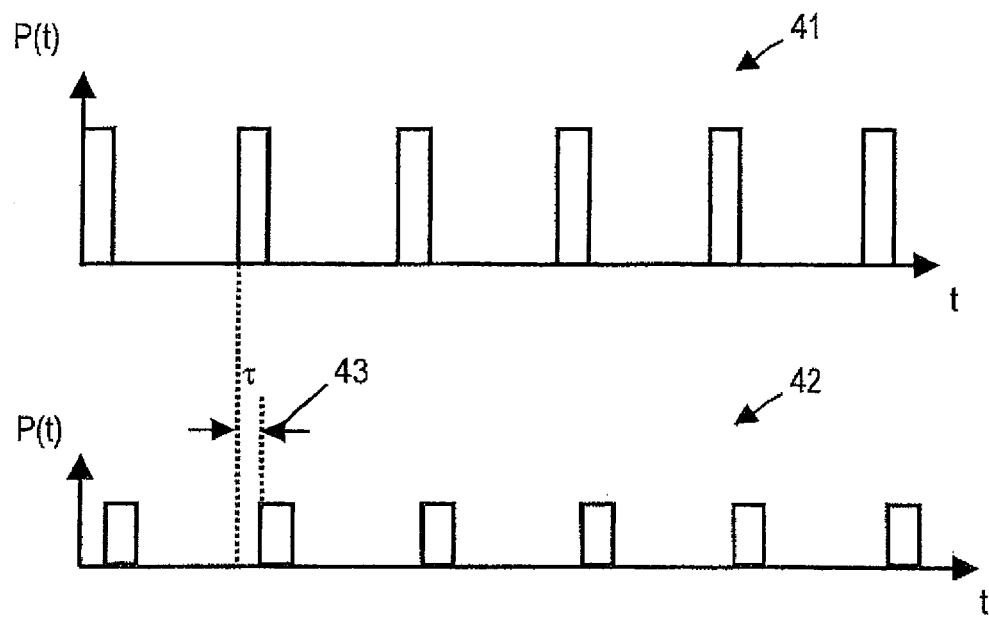
Figure 4:
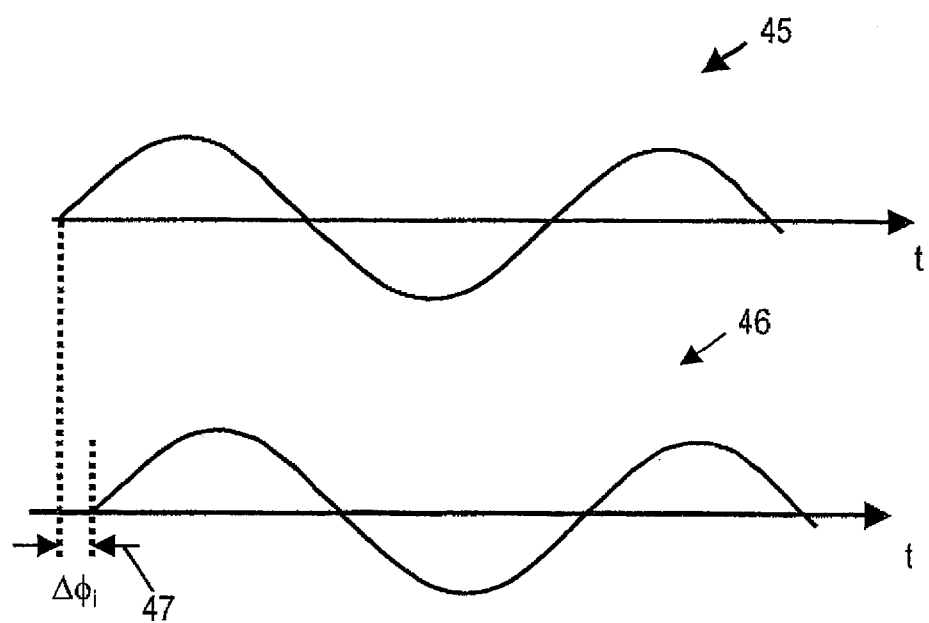

FIGS. 4A and 4B schematically show signals which may occur in an evaluation device according to an embodiment.

Figure 5:
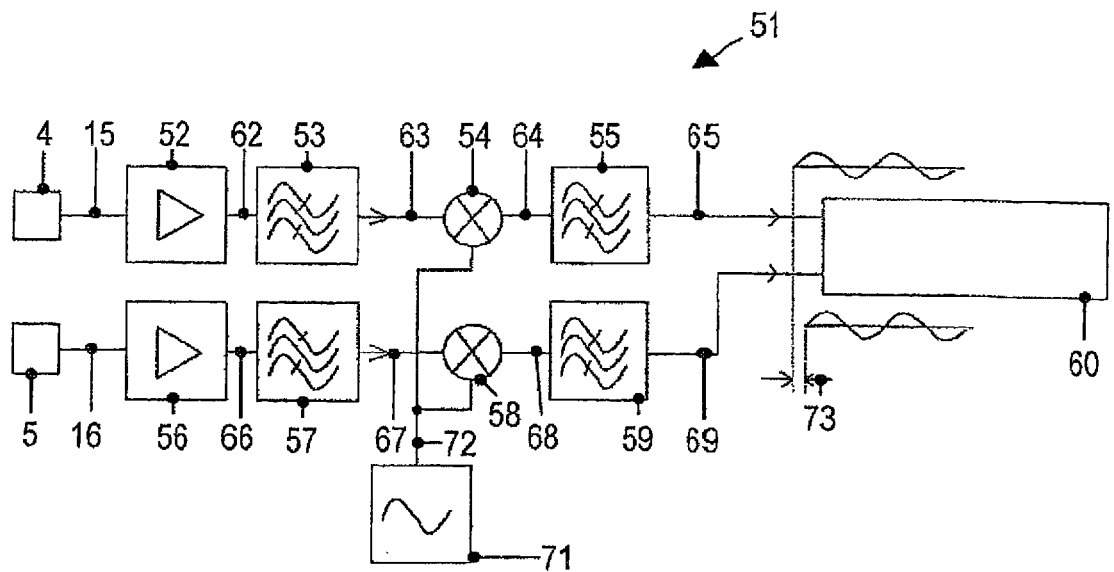

FIG. 5 shows an evaluation device according to an embodiment.

Figure 6:
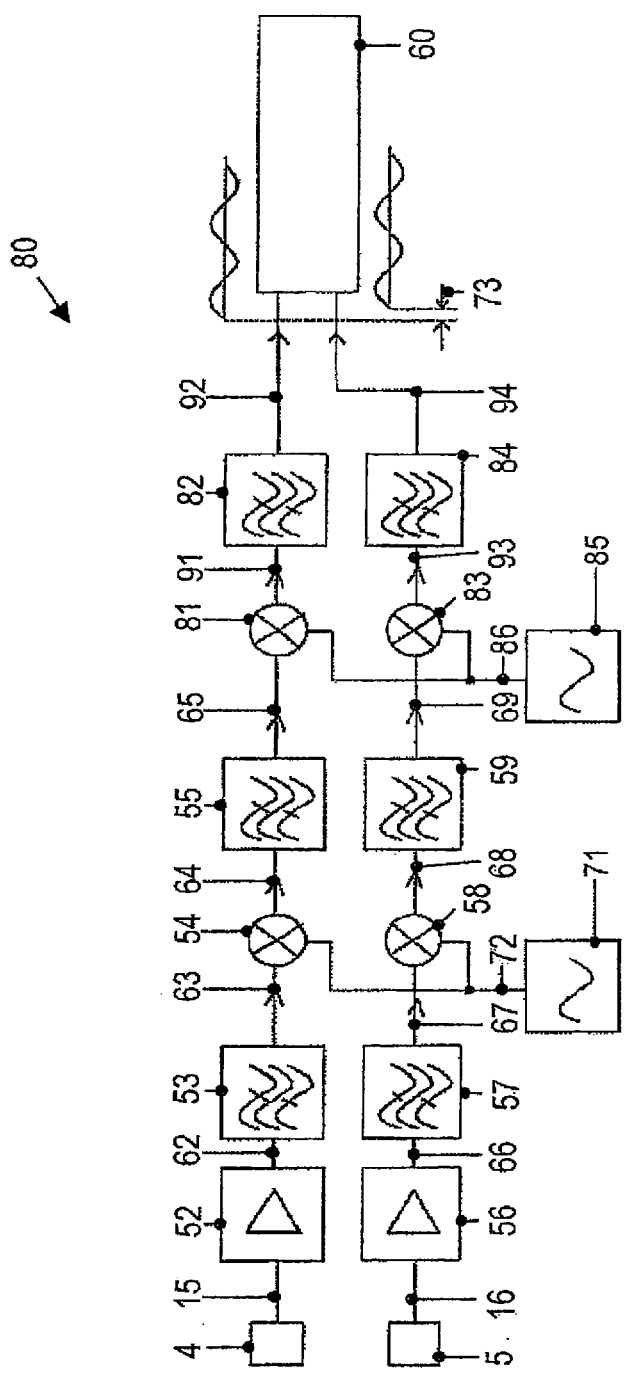

FIG. 6 shows an evaluation device according to an embodiment.

Figure 7:
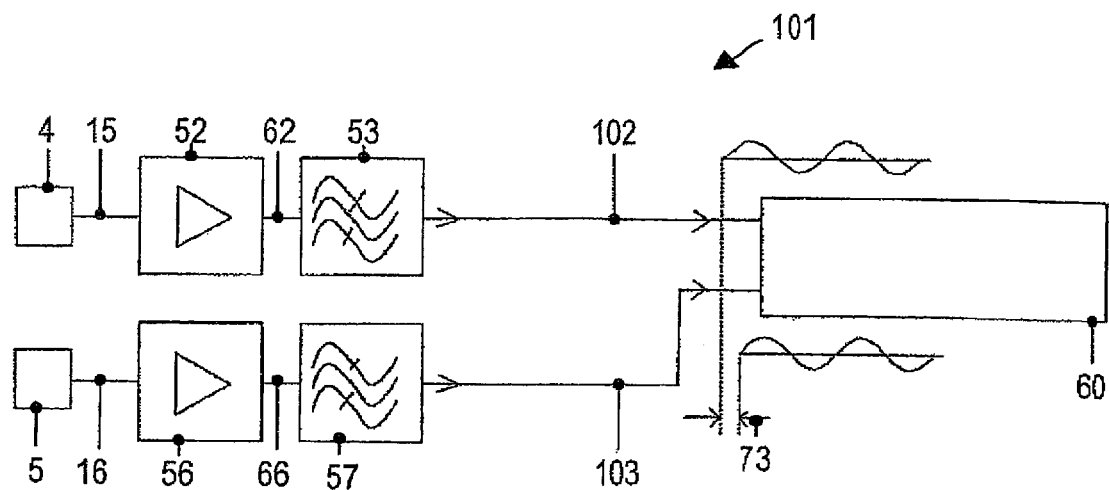

FIG. 7 shows another evaluation device.

Figure 8:
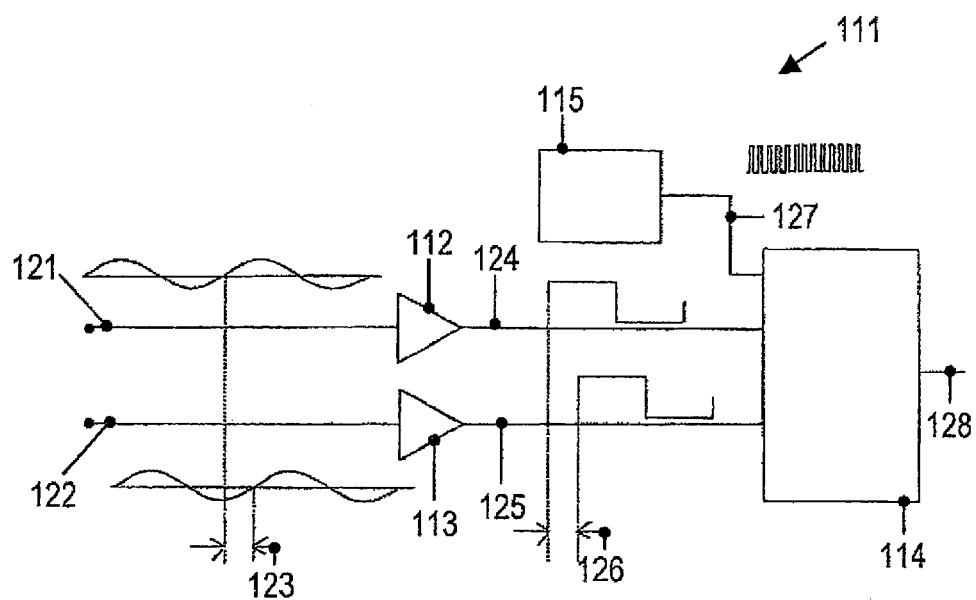

FIG. 8 illustrates an implementation of a phase meter device in an evaluation device according to an embodiment.

Figure 9:
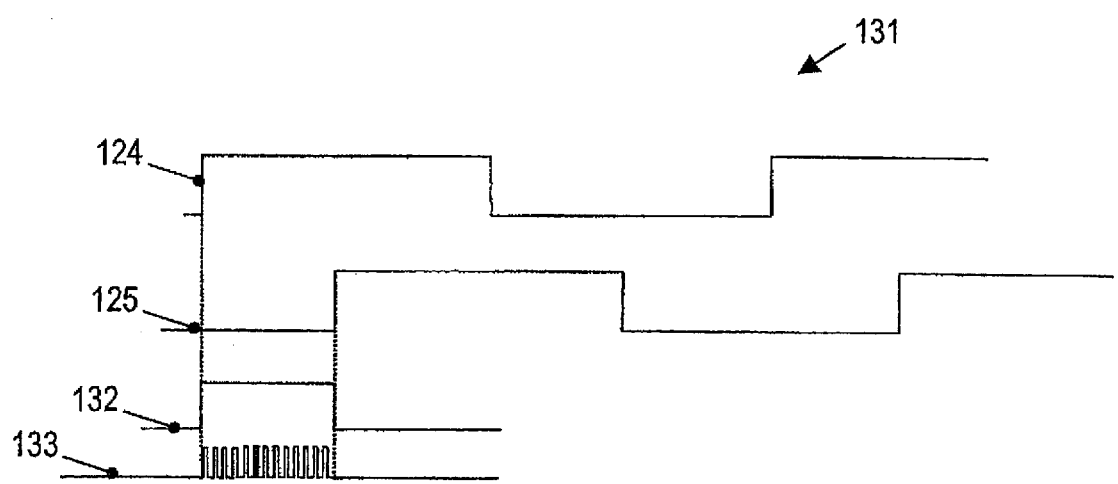

FIG. 9 illustrates signals which occur in the phase meter device of FIG. 8.

In the following, embodiments of the invention will be explained in more detail. Features of the various embodiments may be combined with each other unless this is explicitly excluded in the following description. While some embodiments are described in the context of specific applications, such as determining a position in industrial installations, the invention is not limited to these applications.

The various embodiments are configured for a path length measurement in which a sequence of pulses of electromagnetic radiation travels through a path length to be measured. The sequence of pulses has an amplitude which is modulated with a repetition rate. In order to perform the path length measurement, the pulses of the sequence are generated with the repetition rate by a suitable device, such as a short pulse laser, so that the amplitude and, thus, the power density or beam intensity of the electromagnetic radiation has maxima repeating at the repetition rate, at a given position of the beam path.

Figure 1:
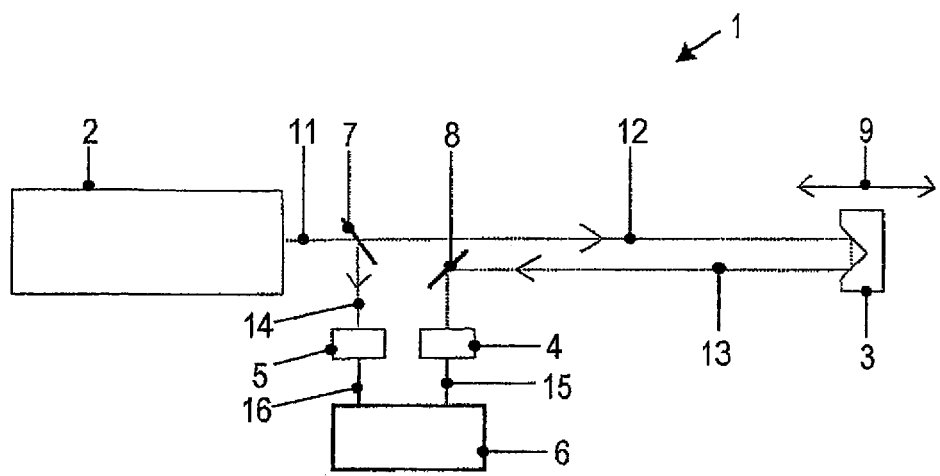
FIG. 1 is a schematic representation of a measuring arrangement according to an embodiment.

FIG. 1 is a schematic representation of a measuring arrangement 1 according to an embodiment. The measuring arrangement 1 comprises a light source 2, a reflector 3 to be mounted to an object, a detector 4, another detector 5 and an evaluation device 6. Further, a beam splitter 7 and a deflecting mirror 8 are provided to direct a reference beam to the other detector 5 and to direct a measurement beam to the detector 4.

The light source 2 may be configured as a laser which is operative as a frequency comb generator. The light source 2 may, in particular, be configured to generate a signal having a high frequency and phase stability. The light source 2 generates a sequence of light pulses having a repetition rate, as will be explained in more detail with reference to FIG. 3.

The beam splitter 7 is arranged in a beam path 11 of the sequence of light pulses generated by the light source 2, to couple out a partial beam towards the other detector 5. The partial beam 12 transmitted by the beam splitter 7 travels from the beam splitter 7 to the reflector 3, where it is reflected into a beam 13 towards the deflecting mirror 8, which directs the beam 13 to the detector 4.

The partial beam 14 coupled out by the beam splitter 7, which is directed onto the other detector 5, travels through a path length which is determined by the geometry of the measuring arrangement 1. The partial beam 12 transmitted by the beam splitter 7, which travels on to the reflector 3 provided on the object, travels through the path from the beam splitter 7 via the reflector 3 and the deflecting mirror 8 to the detector 4, the path length of which depends on the position of the objection on which the reflector 3 is mounted. The different paths covered by the beam which is captured by the detector 4 and the beam which is captured by the other detector 5 give rise to a time shift between the captured signals, which correspond to the run-time delay. The run-time delay gives rise to a phase shift of components in the Fourier representation of the signals captured by the detector 4 and the other detector 5. At least one of these phase shifts is determined to determine the path length difference between the two beams which are captured by the detector 4 and the other detector 5. As a portion of the path length difference which is determined only by the device geometry, such as the distance covered by the partial beam 14 from the beam splitter 7 to the detector 5, is either known or may be taken into account as an offset by calibrating the measuring arrangement, the distance of the object on which the reflecfor 3 is mounted from a reference position, such as the beam splitter 7 or the deflecting mirror 8, may be determined by determining the path length difference. A variable position of the object is schematically indicated with arrow 9.

The beam 12, 13 which travels from the beam splitter 7 via the reflector 3 and the deflecting mirror 8 to the detector 4 and which will be referred to as measurement beam in the following, possibly covers a distance which is significantly longer than that covered by the reference beam 14 which is coupled out by the beam splitter 7 to the other detector. Therefore, the beam splitter 7 may be configured such that it transmits a fairly large fraction, such as approximately 99%, of the intensity of the sequence of light pulses incident upon it as a measurement beam, and that it directs only approximately 1% as reference beam to the other detector 5. This makes it easier to obtain a useful signal which is sufficiently large, even for large distances between object and beam splitter 7 and when the surface of the object is not as reflective, respectively.

The detector 4 may be configured as photodetector which captures an intensity of the measurement beam incident upon it as a function of time and which outputs a measured signal 15 which represents the captured intensity as a function of time. The other detector 5 may be configured as a photodetector which captures an intensity of the reference beam incident upon it as a function of time and which outputs another signal 16 which represents the captured intensity as a function of time. The evaluation device 6 is coupled to the detector 4 and the other detector 5 to evaluate the measured signal 15 and the other signal 16 that represents the intensity of the reference beam. As will be explained in more detail, the evaluation device 6 is configured to determine a phase difference between spectral components of the signals 15, 16.

Figure 2:
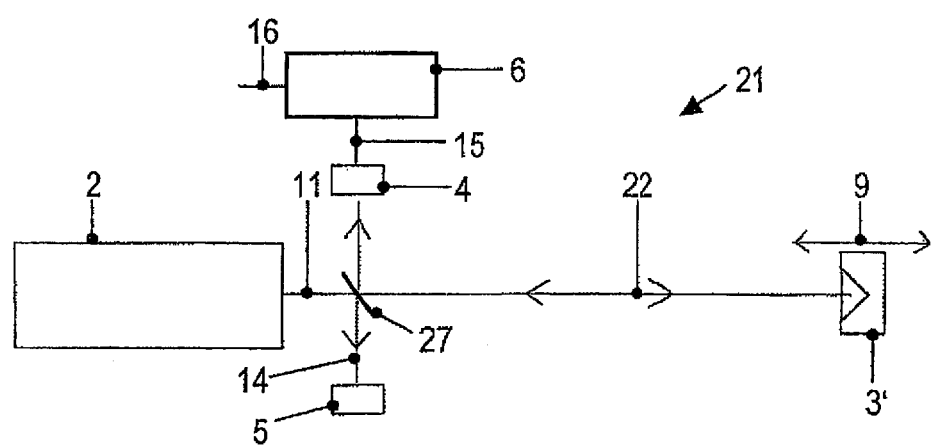
FIG. 2 is a schematic representation of a measuring arrangement according to another embodiment.

FIG. 2 is a schematic representation of a measuring arrangement 21 according to another embodiment. The measuring arrangement 21 comprises a light source 2, a reflector 3' to be mounted to an objection, a detector 4, another detector 5 and an evaluation device 6 which, with regard to their construction, arrangement and operation, correspond to the elements or devices of the measuring arrangement 1 that are designated with the same reference numerals. Further, a beam splitter 27 is provided.

In the measuring arrangement 21, the reflector 3' is configured as a retroreflector which reflects the measurement beam 22 travelling from the beam splitter 27 towards the reflector 3' back into itself. The beam splitter 27 is configured such that it directs the measurement beam 22 reflected back from the object to the detector 4. For this purpose, the beam splitter 27 may be configured such that a large fraction, for example essentially all of the intensity of the measurement beam 22 incident onto the beam splitter 27 from the reflector 3', is directed to the detector 4.

The measuring arrangement 21 corresponds, with regard to the other constructional features, to the measuring arrangement 1. In particular, evaluation device 6 is configured to receive a measured signal 15 from the detector 4 and to determine a phase difference of a component of measured signal 15 for path length measurement.

The measuring arrangements 1 and 21 are exemplary fields of application for the evaluation device and the method for distance measurement which will be explained in more detail with reference to FIG. 3-9. Various modifications may be made in measuring arrangements according to other embodiments.

While the sequence of light pulses propagates freely in the measuring arrangements 1 and 21 explained with reference to FIGS. 1 and 2, the light may, for example, also be partially guided in a light guide, in particular in an optical fiber made from glass or plastic, in measuring arrangements according to other embodiments. The measuring arrangement may comprise an optical fiber, an end of which is for example mounted to the object, the distance of which is to be determined from a reference position. In an embodiment, the other end of the optical fiber may be provided in proximity to the detector 4. The sequence of light pulses is irradiated from the light source 2 towards the end of the optical fiber which is mounted to the object. The sequence of light pulses is coupled into the optical fiber at the object and is guided to the detector 4. In another embodiment, the other end of the optical fiber may be coupled to the light source 2, such that the sequence of light pulses is emitted from the end of the optical fiber mounted to the object and travels to the detector 4.

While, in the measuring arrangements 1 and 21 explained with reference to FIGS. 1 and 2, the other detector 5 is provided to capture the light intensity as a function of time at a reference position, a corresponding reference signal may also be provided in other ways. In an embodiment, the laser 2 which is operative as a frequency comb generator may for example have an output to output an electrical signal which represents the light intensity emitted by the laser 2 as a function of time. This output of the laser 2 may be coupled to the evaluation device 6 which uses the signal provided by the laser 2 as a reference signal or for generating the reference signal for the phase measurement.

While a distance measurement in one dimension is schematically shown in the measuring arrangements 1 and 21, it is also possible that plural detectors 4 and/or plural reflectors 3 to be mounted to the object are used to measure the distance of a reflector from plural reference positions, or the distance of different reflectors from a reference position, as explained in DE 10 2008 045 387, for example. The coordinates of the reflector may than be determined in two or three dimensions, using trilateration, for example.

It is also possible that, rather than a reflector mounted to the object, the surface of the object itself may reflect or scatter light, so that a separate reflector on the object does not need to be provided in further embodiments.

With reference to FIGS. 3-6, the measurement of path lengths using the light source 2, the detector 4 and the evaluation device 6 will be described in more detail.

The light source 2 generates an optical signal which is modulated with a periodic function and which has a fundamental frequency f0 as well as pronounced components of harmonics of the fundamental frequency f0, i.e. pronounced frequency components having frequencies which are multiples of f0. Such a signal is, for example, generated by a short pulse laser which generates a sequence of light pulses in a well-defined interval T0=1/f0, i.e. with a repetition rate f0, with the duration of each pulse being short compared to the interval T0 between successive pulses.

FIG. 3A exemplarily shows the intensity of such a sequence of short light pulses 31, with the output power P of the light source 2 being shown as a function of time t. The interval T0 between successive pulses is schematically indicated with reference sign 32, while the duration of each light pulse is schematically indicated with reference sign 33. The duration of each light pulse may be very short compared to the interval T0 between successive light pulses, for example on the order of $1 \cdot 10^{-5}$. The repetition rate f0 and the duration of each pulse may be suitably selected in dependence on a desired measurement accuracy of the path length or distance measurement, an initial uncertainty on the position of the object, and the signal processing characteristics of the evaluation device 6, or based on additional factors. If the $k^{th}$ harmonic of f0 is to be used for determining the phase difference, the duration of each light pulse and the interval T0 between successive light pulses are selected such that the sequence of light signals output by the light source 2 still has a sufficient spectral weight at frequency $k \cdot f0$. While a sequence of square pulses is exemplarily shown in FIG. 3A, other suitable pulse shapes may also be chosen, for example a square of a hyperbolic secans or a Gauss function.

FIG. 3B exemplarily shows a frequency spectrum 35 of the intensity of a sequence of light pulses which is generated with a repetition rate f0, with the duration of each light pulse being short compared to T0=1/f0. The frequency spectrum 35 has a number of peaks at a constant frequency spacing f0, which is schematically indicated at reference sign 36. The spectral weight of the individual peaks decreases towards higher frequencies, the decrease rate being determined by the ratio of the time interval between successive light pulses and the light pulse duration. For the light source 2 of the device 1, these quantities are selected such that the spectral weight of the component 37 having frequency $k \cdot f0$, which is used for determining phase differences, is sufficiently large to perform a phase measurement.

Figure 3:
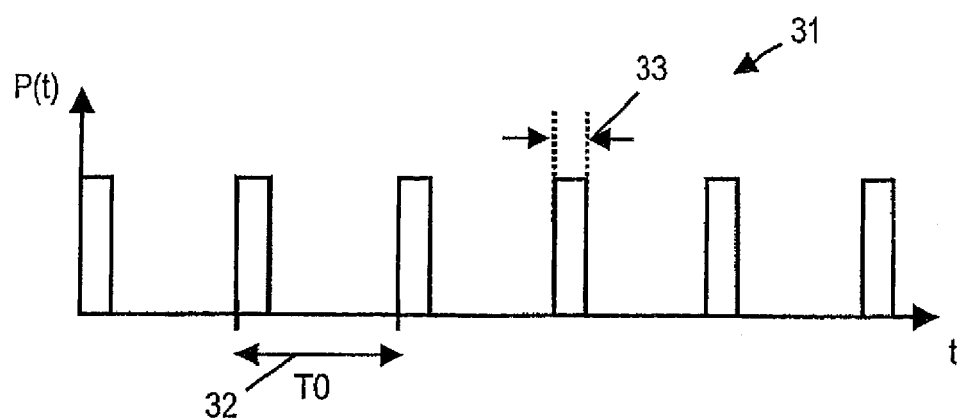
Figure 3:
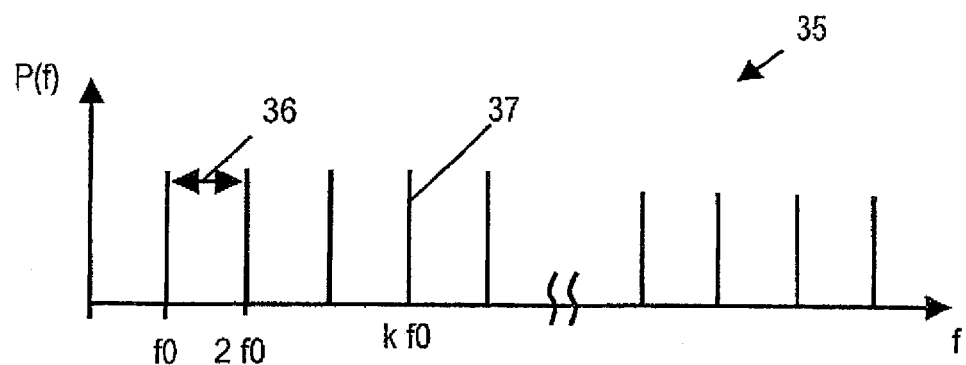

A sequence of light pulses as schematically shown in FIG. 3 can be generated by various lasers which are configured for generating short light pulses. In particular, optical frequency synthesizers may be used. For example, an electrically pumped diode laser, such as a q-switched laser, a gain-switched laser, an active or passive mode-locked laser or a hybrid mode-locked laser, or a mode-locked surface emitting laser having a vertical cavity ("vertical-cavity surface emitting laser", VCSEL) may be used as a light source 2. An optically pumped laser may also be used as light source 2, for example a passive mode-locked surface emitting laser having an external vertical cavity ("vertical external cavity surface emitting lasers", VECSEL) or a laser based on a photonic-crystal-fiber (photonic-crystal-fiber laser). Exemplary pulse durations of the light source 2 lie in a range from 100 fs to 100 ps. Exemplary repetition rates lie in a range from 50 MHz to 50 GHz. Exemplary average powers lie in a range from 1 mW to 10 W. Exemplary values for pulse jitter lie between 10 fs and 1 ps effective value (square mean).

In the measuring arrangements 1 and 21, respectively, the detector 4 captures the intensity of the measurement beam as a function of time, and the other detector 5 captures the intensity of the sequence of light pulses generated by the light source 2 at a reference position.

In a Fourier representation, the intensity of the reference beam captured by the other detector 5 has the spectral representation $$P_R(t)=\Sigma_i a_i \cos(2\pi \cdot i \cdot f0 \cdot t + \phi_{R,i}), \quad (1)$$

for example, where the summation index i runs over the natural numbers with 0, f0 is the repetition rate, $a_i$ is the spectral weight of the spectral component having frequency $i \cdot f0$, t is the time, and $\phi_{R,i}$ is a phase of the spectral component having frequency $i \cdot f0$, which takes into account the path length covered by the reference beam between the point where it is coupled out from the measurement beam, and the other detector 5.

Similarly, in a Fourier representation, the intensity of the measurement beam captured by the detector 4 has the representation $$P_M(t)=\Sigma_i b_i \cos(2\pi \cdot i \cdot f0 \cdot t + \phi_{M,i}), \quad (2)$$

where the summation index i runs over the natural numbers with 0, f0 is the repetition rate, $b_i$ is the spectral weight of the spectral component having frequency $i \cdot f0$, t is the time and $\phi_{M,i}$ is a phase of the spectral component having frequency $i \cdot f0$, which takes into account the path length covered by the measurement beam between the point where it is separated from the reference beam and the detector 4.

The time shift τ between the measured signal 42 and the signal 41 which represents the intensity of the sequence of light pulses at a reference position gives rise to a phase shift or phase difference $$\Delta \phi_i = \phi_{M,i} - \phi_{R,i} \quad (3)$$

between the components of the signals $P_M(t)$ and $P_R(t)$ which oscillate with a frequency $f_i = i \cdot f0$. The modulus of the phase difference is proportional to the time shift τ between the intensities captured by the detector 4 and the other detector 5, $$|\Delta \phi_i| = 2 \cdot \pi \cdot i \cdot f0 \cdot \tau = 2 \cdot \pi \cdot i \cdot f0 \cdot d/c. \quad (4)$$

Here, d denotes a path length difference between the measurement beam and the reference beam, and c is the speed of light.

FIG. 4A illustrates signals which may occur at the inputs of the evaluation device 6 when the light source 2 generates a sequence of short light pulses with a well-defined repetition rate. FIG. 4A shows an exemplary signal 41, which may be captured by the other detector 5, with the power of the reference beam captured by the other detector 5 being shown as a function of time. The measured signal 42, as it may be captured by the detector 4, has a time shift τ indicated at 43 relative to the signal 41 representing the intensity of the reference beam.

FIG. 4B exemplarily shows a component 46 of the measured signal 4, the component oscillating with a frequency i·f0, and a reference signal 45 which oscillates with the frequency i·f0, which may be the component of the signal captured by the other detector 5 oscillating with the frequency i·f0. The oscillating component 46 of the measured signal has a phase difference $\Delta\phi_i$ relative to the reference signal 45.

By determining the phase difference $\Delta\phi_k$ for one of the Fourier components, the path length difference may be determined in accordance with Equation (4). As the phase shift $\Delta\phi_k$ can only be determined up to integer multiples of $2\cdot\pi$, it will be assumed that an estimate dS is known for the path length difference d between measurement beam and reference beam, the estimate approximating the path length difference with an accuracy of c/(k·f0), so that $$|d-dS|<c/(k\cdot f0). \tag{5}$$

Here, k is a natural number which designates the component of the measured signal for which the phase difference is to be determined. The estimate dS for the path length difference may be known in advance, for example, when the object, the position of which is to be determined, may move within a limited spatial region only, with the dimensions of the spatial region being so small that d can vary only within one uniqueness range. The estimate dS may also be determined using other measuring techniques having a coarser resolution. If a laser having a repetition rate of f0=100 MHz is used, for example, and the phase difference is determined for the fundamental wave having k=1 in order to determine the path length, an estimate is required which approximates the path length difference to an accuracy of approximately 3 m.

Based on dS, the part of the phase shift $\Delta\phi_k$ can be determined which is an integer multiple of $2\cdot\pi$. Based on dS, an integer number m is determined such that $$d=d'+m\cdot c/(k\cdot f0), \text{ wherein } 0<d'<c/(k\cdot f0). \tag{6}$$

Accordingly, for positive $\Delta\phi_k$, $$\Delta\phi'_k = \Delta\phi_k - 2\cdot\pi\cdot m \tag{7}$$
$$= 2\cdot\pi\cdot k\cdot f0\cdot(d'/c)$$

is a value which lies within the interval from 0 to $2\cdot\pi$ and which can be determined by measuring the phase angle between a component of the measured signal, which component oscillates with the frequency k·f0, and a reference signal. The quantity d' which may then be determined according to $$d'=c\cdot\Delta\phi'_k/(2\cdot\pi\cdot k\cdot f0) \tag{8}$$

results in an improved value for the path length difference, d, in accordance with Equation (6).

With the two quantities $\Delta\phi_k'$ and $\Delta\phi_k$ differing only by an integer multiple of $2\cdot\pi$ which is irrelevant for determining the phase difference, both quantities will be referred to as phase difference in the following, and no further distinction will be made therebetween.

In the measuring arrangement according to various embodiments, such as in the measuring arrangement 1 of FIG. 1 or the measuring arrangement 21 of FIG. 2, the evaluation device 6 is configured to determine the phase difference between a component of the measured signal captured by the detector 4, which component oscillates with the repetition rate or a multiple of the repetition rate, and a reference signal.

FIG. 5 is a circuit diagram of an evaluation device 51 according to an embodiment which is coupled to photodetectors 4, 5. The evaluation device 51 may be used as evaluation device 6 in the measuring arrangement 1 of FIG. 1 or in the measuring arrangement 21 of FIG. 2.

The evaluation device 51 has an input to receive a measured signal. The input for receiving the measured signal may be coupled to the detector 4, as shown in FIG. 5, to receive the measured signal 15 which represents the intensity of the measurement beam captured by detector 4. The evaluation device 51 has another input to receive the reference signal or a signal from which the reference signal can be derived, for example by filtering. As shown in FIG. 5, the other input may be coupled to the other detector 5 to receive the signal 16 therefrom which represents the intensity of the reference beam captured by the other detector 5. If no other detector 5 is provided for capturing the intensity of the sequence of light pulses at a reference position, the other input of the evaluation device 51 may be coupled to an output of the light source 2 to receive therefrom a signal which indicates the intensity of the generated sequence of light pulses as a function of time.

The evaluation device 51 is configured to determine a phase difference between a component of the measured signal which oscillates with a frequency k·f0 and a reference signal which oscillates with the frequency k·f0. Here, k designates a natural number which is greater than or equal to 1, and f0 designates the repetition rate of the sequence of light pulses. The evaluation device 51 is configured such that, in order to determine the phase difference, a down-conversion is made to generate a first oscillating signal and a second oscillating signal, each of which oscillates with another frequency that is different from the frequency k·f0.

The evaluation device 51 has a signal processing path for the measured signal and another signal processing path for the reference signal. In the signal processing path for the measured signal, mixing and filtering are performed to generate the first oscillating signal by down-conversion of the component of the measured signal. In the other signal processing path for the reference signal, mixing and filtering are performed to generate the second oscillating signal by down-conversion of the reference signal.

The signal processing path for the measured signal comprises an input amplifier 52, a band pass filter 53, a mixer 54 and a filter 55. The measured filter 15 is amplified by the input amplifier 52. The amplified measured signal 62 is supplied to the band pass filter 53. The band pass filter 53 has a pass band in which the frequency k·f0 is located. In an embodiment, the band pass filter may be configured such that no other frequency p·f0 other than the frequency k·f0 is located in the pass band, with p being an integer number different from k. In this case, the output signal 63 of the band pass filter 53 essentially corresponds to the component of the measured signal that oscillates with k·f0.

The output signal 63 of the band pass filter 53 and a third oscillating signal 72 are supplied to the mixer 54. The evaluation device 51 may, for example, have an input to receive the third oscillating signal 72 from an external oscillator 71. An output signal 64 of the mixer 54 has a component which oscillates with the sum of k·f0 and the frequency of the third oscillating signal 72, and a component having lower frequency which oscillates with the modulus of the difference of these frequencies. The output signal 64 of the mixer 54 is supplied to the filter 55. The filter 55 may be configured as a band pass filter or a low pass filter. The filter 55 has a pass band which is selected such that the component of the output signal 64 of the mixer 54 having the lower frequency is transmitted, and that the component of the output signal 64 of the mixer 54 which oscillates with the sum frequency is attenuated relative thereto.

The other signal processing path for the reference signal comprises an input amplifier 56, a band pass filter 57, a mixer 58 and a filter 59. The signal 16 supplied by the other detector 5 is amplified by the input amplifier 56. The amplified signal 66 is supplied to the band pass filter 57. The band pass filter 57 has a pass band in which the frequency k·f0 is located. In an embodiment, the band pass filter may be configured such that no frequency p·f0 other than the frequency k·f0 is located in the pass band, with p being an integer number different from k. In this case, the output signal 67 of the band pass filter 57 is a reference signal which essentially oscillates with the frequency k·f0, which corresponds to the component of the signal 16 captured by the other detector 5 oscillating with k·f0.

The output signal 67 of the band pass filter 57 and the third oscillating signal 72 are supplied to the mixer 58. An output signal 68 of the mixer 58 has a component which oscillates with the sum of k·f0 and the frequency of the third oscillating signal 72, and a component having a lower frequency which oscillates with the modulus of the difference of these frequencies. The output signal 68 of the mixer 58 is supplied to the filter 59. The filter 59 may be configured as a band pass filter or a low pass filter. The filter 59 has a pass band which is selected such that the component of the output signal 68 of the mixer 58 having the lower frequency is transmitted, and that the component of the output signal 68 of the mixer 58 that oscillates with the sum frequency is attenuated relative thereto.

The output signal of the filter 55 in the signal processing path for the measured signal represents the first oscillating signal 65, and the output signal of the filter 59 in the signal processing path for the reference signal represents the second oscillating signal 69, which are generated by the evaluation device 51. Owing to the frequency mixing using the mixers 54, 58 and the subsequent filtering, the first and second signal oscillate with another frequency which is less than the frequency k·f0 of the component of the measured signal for which the phase difference is to be determined. As mixing with the third oscillating signal 72 is performed both at the mixer 54 and at the mixer 58, the phase difference between the signal processing paths remains unchanged. I.e., the first signal 65 and the second signal 69 have the same phase difference as the component 63 of the measured signal oscillating with the frequency k·f0 and the reference signal 67 oscillating with the frequency k·f0. Therefore, the other phase difference between the first signal 65 and the second signal 69 is equal to the phase difference between the component 63 of the measured signal oscillating with the frequency k·f0 and the reference signal 67 oscillating with the frequency k·f0.

The first signal 65 and the second signal 69 are supplied to a phase meter device 60, which measures the other phase difference 73 between the first oscillating signal 65 and the second oscillating signal 69. The phase meter device 60 may determine the other phase difference 73 by determining the time interval between a zero passage of the first signal 65 and a successive zero passage of the second signal 69 in the same direction, for example. A possible configuration of the phase meter device 60 will be explained in more detail with reference to FIGS. 8 and 9. The phase meter device 60 may also comprise a time-to-digital converter which may be used for example to determine the time between a zero passage of the first signal 65 and a successive zero passage of a second signal 69 in the same direction, with a high resolution. The phase meter device 60 may also include one or plural conventional phase evaluators.

The signals processed by the evaluation device 51 may be suitable electrical signals, such as current or voltage signals.

The component 63 of the measured signal which oscillates with the frequency k·f0 may then for example be written in the form $$U_M(t) = U_M \cdot \cos(2\pi \cdot k \cdot f0 \cdot t + \phi_{M,k}). \tag{9}$$

The reference signal oscillating with frequency k·f0 may be written in the form $$U_R(t) = U_R \cdot \cos(2\pi \cdot k \cdot f0 \cdot t + \phi_{R,k}) \tag{10}$$

Here, $U_M$ and $U_R$, respectively, denote amplitudes of the signals, f0 denotes the repetition rate of the sequence of light pulses, t denotes the time, and $\phi_{M,k}$ and $\phi_{R,k}$ denote phases of the signals brought about by the path length covered by the measurement beam and the reference beam, respectively.

The third oscillating signal 72 may be written in the form $$U_x(t) = U_x \cdot \cos(2\pi \cdot f_x \cdot t + \phi_x), \tag{11}$$

where $U_x$ is an amplitude, $f_x$ is a frequency and $\phi_x$ is a phase angle of the third oscillating signal 72 which is generally not known.

By frequency mixing the component 63 of the measured signal oscillating with the frequency k·f0 and the third oscillating signal 72, a signal $$U_M(t) \cdot U_x(t) = U_M \cdot U_x \cdot \cos(2\pi \cdot k \cdot f0 \cdot t + \phi_{M,k}) \cdot \cos(2\pi \cdot f_x \cdot t + \phi_x) \tag{12}$$

is generated, which has a component oscillating with the sum frequency k·f0+$f_x$ and a component oscillating with the difference frequency k·f0−$f_x$. The component oscillating with the difference frequency, which is obtained by filtering using the filter 55, is given by $$U_1(t) = (½) \cdot U_M \cdot U_x \cdot \cos[2\pi \cdot (k \cdot f0 - f_x) \cdot t + (\phi_{M,k} - \phi_x)] \tag{13}$$

and represents the generated first signal 65.

By frequency mixing the reference signal 67 oscillating with the frequency k·f0 and the third oscillating signal 72, a signal $$U_R(t) \cdot U_x(t) = U_R \cdot U_x \cdot \cos(2\pi \cdot (k \cdot f0 - f_x) \cdot t + \phi_{R,k}) \cdot \cos(2\pi \cdot f_x \cdot t + \phi_x) \tag{14}$$

is generated, which has a component oscillating with the sum frequency k·f0+$f_x$ and a component oscillating with the difference frequency k·f0−$f_x$. The component oscillating with the difference frequency, which is obtained by filtering with the filter 59, is given by $$U_2(t) = (½) \cdot U_R \cdot U_x \cdot \cos[2\pi \cdot (k \cdot f0 - f_x) \cdot t + (\phi_{R,k} - \phi_x)] \tag{15}$$

and represents the generated second signal 69.

The first signal $U_1(t)$, which is generated by down-converting the component of the measured signal $U_M(t)$ oscillating with the frequency k·f0, and the second signal $U_2(t)$, which is generated by down-converting the reference signal $U_R(t)$ oscillating with the frequency k·f0, each oscillates with the difference frequency k·f0−$f_x$ and have a phase difference $$\Delta\phi_{1-2} = (\phi_{M,k} - \phi_x) - (\phi_{R,k} - \phi_x) = \Delta\phi_k \tag{16}$$

that is equal to the phase difference between $U_M(t)$ and $U_R(t)$.

The evaluation device 51 is thus configured to down-convert a component of the measured signal oscillating with the frequency k·f0 and the reference signal, while maintaining the relative phase angle.

With the first and second signal oscillating with a frequency which is different from the frequency k·f0, a suitable selection of the frequency $f_x$ of the third oscillating signal allows the first and second signal to be generated such that they have a frequency which is convenient for the subsequent determination of the phase difference. If, for example, the phase difference is determined by measuring a time interval between a zero passage of the first signal and a zero passage of the second signal in the same direction, the frequency $f_x$ of the third oscillating signal may be selected such that the first signal and the second signal oscillate with the other frequency which is small compared to the frequency k·f0. This allows the phase resolution to be increased for a given time resolution of the phase meter device 60. The frequency $f_x$ of the third oscillating signal may in particular also be selected such that the first signal and the second signal oscillate with the other frequency which is less than the repetition rate f0.

In an embodiment, k=1 may be selected, for example. I.e., the phase difference may be determined for the fundamental wave of the light intensity oscillating with f0 for performing a path length measurement. In this case, the third signal may also oscillate with a frequency $f_x$ which is less than f0, for example with $f_x$=0.9·f0.

If the third oscillating signal 72 is provided by an external oscillator 71, an oscillator 71 may in particular be selected which has a high phase and frequency stability. Alternatively, the evaluation device 51 may also be configured such that it generates the third oscillating signal from the reference signal or a component of the measured signal, for example. For this purpose, the evaluation device may have a corresponding branch off from the signal processing path or from the other signal processing path to generate the third oscillating signal by frequency division and/or frequency multiplication. The evaluation device may, for example, comprise a frequency divider to generate, from the reference signal or a component of the measured signal, the third oscillating signal, which has a frequency that does not correspond to a multiple of the repetition rate. The frequency of the third oscillating signal may in particular correspond to the product of the repetition rate f0 and a rational number u/v, with u and v being integer numbers. Such third oscillating signals may be synthesized by frequency division and mixing, for example.

Modifications of the evaluation device 51 may be implemented in evaluation devices according to other embodiments. For example, the band pass filters 53, 57 may also be omitted if the filters 55 and 59 are configured with such a pass band that they transmit the first and second signal of the output signal of the mixers. Therefore, in other embodiments, it is possible that the reference signal is down-converted together with the other spectral components of the signal 16 provided by the other detector 5, before the filter 59 transmits the second signal of the output signal of the mixer 58.

In another embodiment, the down-conversion in the signal processing path for the measured signal and in the other signal processing path for the reference signal may be performed in plural stages.

FIG. 6 is a circuit diagram of an evaluation device 80 according to an embodiment which is coupled to photodetectors 4, 5. The evaluation device 80 may be used as evaluation device 6 in the measuring arrangement 1 of FIG. 1 or in the measuring arrangement 21 of FIG. 2. Elements and devices of the evaluation device 80 which correspond, with regard to their construction or operation, to elements and devices of the evaluation device 51 are designated with the same reference numerals, with additional reference being made to the description of the evaluation device 51.

The evaluation device 80 comprises a signal processing path for the measured signal having an amplifier 52, a band pass filter 53, a mixer 54 and a filter 55 which correspond to corresponding elements of the evaluation device 51 as regards their operation. The signal processing path for the measured signal has a second mixer 81 and a filter 82 to filter an output signal 91 of the mixer 81. The output signal 65 of the filter 55 and a fourth oscillating signal 86 are supplied to the second mixer 81. The fourth oscillating signal 86 may be generated by an oscillator 85, for example. The output signal 91 of the second mixer 81 comprises a component which oscillates with the sum of the frequency of the output signal 65 of the filter 55 and the frequency of the fourth oscillating signal 86, and a component which oscillates with a lower difference frequency. The output signal 91 of the second mixer 81 is supplied to the filter 82. The filter 82 may be configured such that the component of the output signal 91 of the second mixer 81 which oscillates with the lower difference frequency is located in the pass band of the filter 82, while the component oscillating with the sum frequency is strongly attenuated in comparison thereto. The output signal of the filter 82 serves as first signal 92. The first signal 92 oscillates with a frequency which corresponds to the difference between the frequency of the output signal 65 of the filter 55 and the frequency of the fourth oscillating signal 86.

The evaluation device 80 comprises another signal processing path for the reference signal having an amplifier 56, a band pass filter 57, a mixer 58 and a filter 59, which correspond, with regard to their operation, to the corresponding elements of the evaluation device 51. The signal processing path for the measured signal has a second mixer 83 and a filter 84 for filtering an output signal 93 of the mixer 83. The output signal 69 of the filter 59 and the fourth oscillating signal 86 are supplied to the second mixer 83. The output signal 93 of the second mixer 83 comprises a component which oscillates with the sum of the frequency of the output signal 69 of the filter 59 and the frequency of the fourth oscillating signal 86, and a component which oscillates with a lower difference frequency. The output signal 93 of the second mixer 83 is supplied to the filter 84. The filter 84 may be configured such that the component of the output signal 93 of the second mixer 83 which oscillates with the lower difference frequency is located in the pass band of the filter 84, while the component oscillating with the sum frequency is strongly attenuated in comparison thereto. The output signal of the filter 84 serves as second signal 94. The second signal 94 oscillates with a frequency which corresponds to the difference between the frequency of the output signal 69 of the filter 59 and the frequency of the fourth oscillating signal 86.

With the other mixer 81 in the signal processing path for the measured signal and the other mixer 83 in the signal processing path for the reference signal being supplied with the same fourth oscillating signal 86, the phase difference is also maintained between the components of the signals 91, 93 oscillating with the difference frequency in the two-stage mixing in the evaluation device 80. The other phase difference between the first signal 92 and the second signal 94 is equal to a phase difference between the component of the measured signal oscillating with the repetition rate or a multiple of the repetition rate, and the reference signal oscillating with this frequency.

In the evaluation device 80, the fourth oscillating signal 86 may be provided by an external oscillator 85. Alternatively, the evaluation device may be configured such that it synthesizes the fourth oscillating signal from the reference signal or a component of the measured signal, for example. For this purpose, the evaluation device may have a corresponding branch off from the signal processing path or from the other signal processing path to generate the fourth oscillating signal by frequency division and/or frequency multiplication.

In the evaluation device 80, the component of the measured signal oscillating with the frequency and the reference signal may be down-converted in plural stages via an intermediate frequency. If a light source having a repetition rate f0=100 MHz is used, for example, the oscillator 71 may be tuned to 96 MHz. The signals 65 and 69 accordingly have a frequency of 4 MHz. The oscillator 85 may for example be tuned to a frequency of 3.990 MHz. The first signal 92 and the second signal 94 which are generated by the evaluation device 80 accordingly have a frequency of 10 kHz, with the phase difference remaining unchanged by the down-conversion.

If the phase difference is for example determined by the phase meter device 60 by measuring the time interval between a zero passage of the first signal 92 and the successive zero passage of the second signal 94 in the same direction, a higher phase resolution can be attained for a given time resolution when the time interval between the zero passages is measured, when the first and second signals 92, 94 oscillate with a smaller frequency due to the down-conversion.

FIG. 7 is a circuit diagram of an evaluation device 101 according to another aspect of the invention, which is coupled to photodetectors 4, 5. The evaluation device 101 may be used as evaluation device 6 in the measuring arrangement 1 of FIG. 1 or in the measuring arrangement 21 of FIG. 2.

The evaluation device 101 may in particular be used for path length measurement if even for signals oscillating with the repetition rate f0, the phase difference can be determined with an accuracy which is sufficient to attain a target accuracy for the path length measurement.

The evaluation device 101 comprises a signal processing path for a measured signal, to which the measured signal 15 captured by the detector 4 is supplied as an input signal, and a signal processing path for a reference signal, to which the output signal 16 of the other detector 5 is supplied as an input signal.

The signal processing path for the measured signal has an input amplifier 52 and a band pass filter 53. The output signal 62 of the amplifier 52 is supplied to the band pass filter 53. The band pass filter 53 has a pass band in which, for example, the frequency that corresponds to the repetition rate f0 or a small multiple k·f0 of the repetition rate is located. For example, the pass band of the band pass filter 53 may comprise the repetition rate f0 and may have a width which is less than f0. The output signal 102 of the band pass filter 53 then is the component of the measured signal 15 that oscillates with the frequency f0.

The other signal processing path for the reference signal has an input amplifier 56 and a band pass filter 57. The output signal 66 of the amplifier 56 is supplied to the band pass filter 57. The band pass filter 57 has a pass band in which, for example, the frequency corresponding to the repetition rate f0 or a small multiple k·f0 of the repetition rate is located. The pass band of the band pass filter 57 may, for example, comprise the repetition rate f0 and may have a width which is less than f0. The output signal 103 of the band pass filter 57 then is the component of the signal 16 provided by the other detector, which oscillates with the frequency f0.

The output signal 102 of the band pass filter 53 and the output signal 103 of the band pass filter 57 are supplied to the phase meter device 60 which determines the phase difference 73 between the signals. In the evaluation device 101, the phase difference is therefore determined for a component of the captured intensity of the measurement and reference beams which oscillate with f0 or a small multiple of f0.

With reference to FIGS. 8 and 9, a possible configuration of a phase meter device will be described.

FIG. 8 is a schematic circuit diagram of a phase meter device 111. The phase meter device 111 may be used as phase meter device 60 in the evaluation device 51 of FIG. 5, in the evaluation device 80 of FIG. 6 or in the evaluation device 101 of FIG. 7.

The phase meter device 111 is configured to determine the time interval between a zero passage of a first oscillating signal 121 and a successive zero passage of a second oscillating signal 122 in the same direction. For a known oscillation frequency of the first and second oscillating signals 121, 122, the phase difference may be determined as product of the time interval between the zero passages and the oscillation frequency of the first and second oscillating signals 121, 122. The time interval is schematically shown at reference numeral 123.

When the phase meter device 111 is used in the evaluation device according to an embodiment, the first oscillating signal 121 may be the first oscillating signal generated by the evaluation device by down-converting the component of the measured signal, and the second oscillating signal 122 may be the second oscillating signal generated by the evaluation device by down-converting the reference signal.

The phase meter device 111 comprises a first circuit element 112, such as a comparator or a limiting amplifier, that is configured to convert the first oscillating signal 121 into a square-shaped signal 124. The first circuit element 112 may for example be configured such that the output signal 124 of the first circuit element 112 has the logical value "1" if the first oscillating signal 121 is positive or is equal to zero, and that it has the logical value "0" when the first oscillating signal 121 is negative. The phase meter device 111 comprises a second circuit element 113, e.g. a comparator or a limiting amplifier, which is configured to convert the second oscillating signal 122 into a square-shaped signal 125. The second circuit element 113 may for example be configured such that the output signal 125 of the second circuit element 113 has the logical value "1" if the second oscillating signal 122 is positive or is equal to zero, and that it has the logical value "0" when the second oscillating signal 122 is negative.

The two square-shaped signals 124, 125 may be supplied to a digital evaluation, in which a counter 114 is started for example with the positive edge of the signal 124. The counter 114 is stopped with the positive edge of the signal 125. The counter is supplied with a periodic clock signal 127 from a clock signal source 115 and counts the pulses of the clock signal 127 in the time interval 126 between the positive edges of the square-shaped signals 124, 125. The time interval 126 between the positive edges of the square-shaped signals 124, 125 is equal to the time interval 123 between the zero passage of the first oscillating signal 121 and the successive zero passage of the second oscillating signal 122 in the same direction.

FIG. 9 illustrates the various signals at the counter 114. The square-shaped signal 124 which starts the counter and the square-shaped signal 125 which stops the counter define a time window represented by the signal 132. In the time window, the transmission of the pulses 127 generated by the pulse signal generator 115 to a counting unit is allowed such that the counter value increases in the time window between the positive edges of the square-shaped signals 124, 125, in accordance with the number of pulses. For this purpose, the clock signal 127 may for example be transmitted to the input of the counting unit only in the time window represented by the signal 132, as indicated in signal 133. The number of the pulses provided by the clock signal generator 115 in this time window is proportional to the phase difference. The counter value that represents the phase difference may be read out using conventional techniques, for example over a computer interface, and may be provided to a computer.

In another mode of operation of the phase meter device, the measurement described above may for example be performed plural times. For this purpose, the counting unit of the counter 114 counts the number of the pulses provided by the clock signal generator 115 between the rising edges of the square-shaped signals 124 and 125 several times, e.g. ten times. The counter value may subsequently be divided by the count of repetitions of the measurement. Thereby, an averaging may be performed over several counting periods.

Various modifications of the phase meter 111 may be implemented in other embodiments. For example, the counter may additionally also be triggered by the falling edges of the square-shaped signals 124, 125, so that two phase measurements are performed in each periodic cycle. The clock signal generator 115 may be implemented such that it derives the clock signal 127 from the measured signal or from a component of the measured signal.

The phase resolution or accuracy which is attained by the phase meter 111 is determined by the ratio of the other frequency at which the first oscillating signal 121 and the second oscillating signal 122 oscillate, and the clock signal 127 provided by the clock signal generator 115. If the first oscillating signal 121 and the second oscillating signal 122 have a frequency of 10 kHz, for example, and the clock signal generator 115 outputs pulses at a frequency of 100 MHz, a phase of $2 \cdot \pi$ or 360°, respectively, may be measured with a resolution of 10000 steps. Accordingly, for a clock signal generator 115 which outputs pulses at a frequency of 1 GHz, which is for example common for personal computers, an angle of $2 \cdot \pi$ or 360° could be measured with a resolution of $10^5$ steps.

If an evaluation device having such a phase meter device is used to measure the phase difference for example in the measuring arrangement 1 of FIG. 1 or in the measuring arrangement 2 of FIG. 2, path length measurements in the range of a few micrometers or a few ten micrometers can be realized. If, for example, the light source is configured as a frequency comb generator and generates light pulses with a repetition rate f0=100 MHz, and if the phase difference for the component of the measured signal oscillating with the frequency f0, i.e. the fundamental wave having the frequency f0, is determined for path length measurement by down-converting this component to a frequency of 10 kHz, a path length measurement may be performed at a resolution of 3 m/$10^5$=30 μm, if the clock signal generator 115 outputs pulses at a frequency of 1 GHz. In a reflection mode in which the measurement beam travels twice through the distance between light source and detector arrangement and the object, there is a distance resolution of 15 μm.

The resolution may be increased further if a harmonic, rather than the fundamental wave, is used to determine the phase difference. If for the parameters mentioned in the preceding paragraph, the component of the measured signal having the frequency 1 GHz=10·f0 is down-converted to 10 kHz for path length measurement and is evaluated, a distance resolution of 1.5 μm is attained, for example, owing to the larger phase difference.

Other phase meter devices may be used in evaluation devices according to other embodiments. The first and second oscillating signal may be sampled, for example, with a fit being subsequently made to the sampled values to determine the phase difference. It is also possible that a conventional phase meter is used.

Evaluation devices, measuring arrangements and methods according to various embodiments of the invention have been described in detail. Other modifications may be implemented in other embodiments. The path length measurement may be performed using a sequence of light pulses, with the light having a wavelength in the visible, ultraviolet and in particular also infrared spectral range. In other embodiments, a sequence of electromagnetic pulses having a wavelength located outside of the optical spectral range may be used instead of a sequence of light pulses.

The evaluation devices, measuring arrangements and methods according to various embodiments of the invention allow a path length measurement to be performed with a high spatial resolution, in particular using optical techniques. The path length measurement may for example be used to measure the distance of an object from a reference position. By combining at least two such path length measurements, the position of an object may be determined in a plane by trilateration. By combining at least three such path length measurements, the position of an object may be determined in a three-dimensional space, for example by means of trilateration. The various embodiments may generally be used for distance or position determination, with exemplary fields of application being measuring applications in industrial installations, for example in automated production or transportation installations.

The invention claimed is:

1. An evaluation device for path length measurement, configured to evaluate a measured signal which represents an intensity of a sequence of pulses of electromagnetic radiation, in particular of a sequence of light pulses, as a function of time after the sequence of pulses has covered a path length to be measured, the sequence of pulses having a repetition rate, the evaluation device being configured to determine a phase difference between a component of the measured signal, which component oscillates with a frequency, and a reference signal which oscillates with said frequency, said frequency corresponding to the repetition rate or a multiple of the repetition rate, and wherein the evaluation device is configured to generate, in order to determine the phase difference, a first signal and a second signal having another phase difference such that the first signal and the second signal each oscillates with another an other frequency which is different from said frequency, and that the other phase difference has a predetermined relation to said phase difference, the intensity of the sequence of pulses having harmonics, the harmonics having frequencies which are multiples of the repetition rate, the evaluation device being configured to respectively mix the component of the measured signal and the reference signal with a third oscillating signal to generate the first signal and the second signal by down-conversion, and the evaluation device being configured to generate the first signal and the second signal such that said other frequency at which the generated first signal and the generated second signal oscillate, less than the repetition rate.

2. The evaluation device according to claim 1, wherein the evaluation device is configured to generate the first signal and the second signal such that the other phase difference is equal to the phase difference between the component of the measured signal and the reference signal.

3. The evaluation device according to claim 1, comprising a signal processing path for the measured signal, which has a mixer to mix said component of the measured signal with the third oscillating signal to generate the first signal, wherein the signal processing path has a filter to filter an output signal of the mixer.

4. The evaluation device according to claim 3, comprising another signal processing path for the reference signal, which has another mixer to mix the reference signal with the third oscillating signal to generate the second signal, wherein the other signal processing path has another filter to filter an output signal of the other mixer.

5. The evaluation device according to claim 4, wherein the signal processing path has at least one second mixer to mix an output signal of the mixer with a fourth oscillating signal to generate the first signal, and wherein the other signal processing path has at least one other second mixer to mix an output signal of the other mixer with the fourth oscillating signal, to generate the second signal.

6. The evaluation device according to claim 3, wherein the third oscillating signal has a frequency which is selected such that a quotient of the frequency of the third oscillating signal and the repetition rate is not an integer number, wherein the evaluation device is configured to generate the third oscillating signal from the measured signal or from the reference signal.

7. The evaluation device according to claim 1, comprising a phase measurement device having inputs for the first signal and the second signal to determine the other phase difference.

8. A measuring arrangement for path length measurement, comprising a detector configured to capture an intensity of a sequence of pulses of electromagnetic radiation, in particular of a sequence of light pulses, as a function of time after the sequence of pulses has covered a path length to be measured, the sequence of pulses having a repetition rate, the detector being configured to provide a measured signal which represents the captured intensity, and an evaluation device according to claim 2 which is coupled to the detector to process the measured signal provided by the detector.

9. The measuring arrangement according to claim 8, comprising a light source to generate the sequence of pulses, wherein the light source comprises a laser, in particular a short pulse laser.

10. The measuring arrangement according to claim 9, wherein the light source is configured to output an output signal which represents an intensity of the generated sequence of pulses as a function of time, wherein the evaluation device is coupled to the light source and is configured to generate the reference signal from the output signal of the light source.

11. The measuring arrangement according to claim 9, comprising another detector configured to capture an intensity of the generated sequence of pulses as a function of time at a reference position, wherein the evaluation device is coupled to the other detector and is configured to generate the reference signal from an output signal of the other detector.

12. A method for path length measurement, wherein a measured signal is captured and evaluated which represents an intensity of a sequence of pulses of electromagnetic radiation, in particular of a sequence of light pulses, as a function of time after the sequence of pulses has covered a path length to be measured, wherein the sequence of pulses has a repetition rate, wherein the method comprises determining a phase difference between a component of the measured signal, which component oscillates with a frequency, and a reference signal which oscillates with said frequency, wherein said frequency corresponds to the repetition rate or a multiple of the repetition rate, wherein, in order to determine the phase difference, a first signal and a second signal are generated such that the first signal and the second signal each oscillates with an other frequency that is different from said frequency, and that the first signal and the second signal have another phase difference which has a predetermined relation to said phase difference, the intensity of the sequence of pulses having harmonics, the harmonics having frequencies which are multiples of the repetition rate, wherein the component of the measured signal and the reference signal are respectively mixed with a third oscillating signal to generate the first signal and the second signal by down-conversion, and wherein the first signal and the second signal are generated such that said other frequency at which the generated first signal and the generated second signal oscillate, is less than the repetition rate.

13. The method according to claim 12, wherein the first signal and the second signal are generated such that the other phase difference is equal to said phase difference between said component of the measured signal and the reference signal.

14. The method according to claim 12, wherein said component of the measured signal is down-converted in plural stages to generate the first signal.

15. The method according to claim 12, wherein the reference signal is down-converted in plural stages to generate the second signal.

16. The method according to claim 12, wherein a frequency of the third oscillating signal is selected such that a quotient of the frequency of the third oscillating signal and the repetition rate is not an integer number.

17. The method according to claim 12, wherein said other phase difference is determined by determining an interval between zero passages of the first signal and of the second signal.

18. The method according to claim 12, wherein the sequence of light pulses is generated by a short pulse laser.

19. The method according to claim 12, wherein the measured signal is evaluated by the evaluation device according to claim 1.

20. The method according to claim 12, used to determine plural coordinates of an object in a two or three dimensional spatial region.

* * * * *

UNITED STATES PATENT AND TRADEMARK OFFICE
CERTIFICATE OF CORRECTION

PATENT NO. : 8,692,981 B2  
APPLICATION NO. : 13/377410  
DATED : April 8, 2014  
INVENTOR(S) : Spruck et al.

Page 1 of 1

It is certified that error appears in the above-identified patent and that said Letters Patent is hereby corrected as shown below:

On the Title Page, Item 56: under Other Publications, line 3, change "Allied Optics" to --Applied Optics--.

In the Claims

Column 20, line 34 (Claim 1) delete the word "another".

Column 20, line 46 (Claim 1) add the word "is" after the "," so that ", less than the repetition rate" reads --, is less than the repetition rate--.

Column 21, line 22 (Claim 8) change "claim 2" to --claim 1--.

Signed and Sealed this  
Twenty-fourth Day of June, 2014

Michelle K. Lee  
*Deputy Director of the United States Patent and Trademark Office*